United States Patent
Davis et al.

(10) Patent No.: US 8,599,550 B2
(45) Date of Patent: Dec. 3, 2013

(54) STORAGE ENCLOSURE, CARRIER AND METHODS

(75) Inventors: David Michael Davis, Portsmouth (GB); Michael Easton, Waterlooville (GB); Graham Collins, Louvigne-du-Desert (FR)

(73) Assignee: Xyratex Technology Limited, Havant (GB)

(*) Notice: Subject to any disclaimer, the term of this patent is extended or adjusted under 35 U.S.C. 154(b) by 382 days.

(21) Appl. No.: 12/722,012

(22) Filed: Mar. 11, 2010

(65) Prior Publication Data

US 2011/0222234 A1 Sep. 15, 2011

(51) Int. Cl.
*G06F 1/16* (2006.01)
*H05K 5/00* (2006.01)
*H05K 7/00* (2006.01)

(52) U.S. Cl.
USPC .......... 361/679.39; 361/679.33; 361/727

(58) Field of Classification Search
USPC .......... 361/679.33–679.39, 724–727
See application file for complete search history.

(56) References Cited

U.S. PATENT DOCUMENTS

| | | | |
|---|---|---|---|
| 5,412,534 A * | 5/1995 | Cutts et al. ............ 361/695 |
| 6,373,695 B1 * | 4/2002 | Cheng ............ 361/679.39 |
| 6,621,693 B1 * | 9/2003 | Potter et al. ............ 361/679.33 |
| 6,757,748 B1 * | 6/2004 | Hipp ............ 710/2 |
| 6,987,674 B2 * | 1/2006 | El-Batal et al. ............ 361/788 |
| 7,039,299 B2 * | 5/2006 | Onodera ............ 386/200 |
| 7,042,720 B1 * | 5/2006 | Konshak et al. ............ 361/679.33 |
| 7,193,856 B2 * | 3/2007 | Hidaka ............ 361/725 |
| 7,200,008 B1 * | 4/2007 | Bhugra ............ 361/724 |
| 7,304,855 B1 * | 12/2007 | Milligan et al. ............ 361/724 |
| 7,359,186 B2 * | 4/2008 | Honda et al. ............ 361/679.33 |
| 7,394,660 B2 * | 7/2008 | Hidaka ............ 361/727 |
| 7,400,469 B2 * | 7/2008 | Starr et al. ............ 360/92.1 |
| 7,400,510 B1 * | 7/2008 | Milligan et al. ............ 361/752 |
| 7,583,507 B2 * | 9/2009 | Starr et al. ............ 361/727 |
| 7,715,188 B2 * | 5/2010 | Matsushima et al. ..... 361/679.51 |
| 7,876,557 B2 * | 1/2011 | Suzuki et al. ............ 361/679.49 |
| 8,111,514 B2 * | 2/2012 | Imsand ............ 361/714 |
| 2002/0080575 A1 * | 6/2002 | Nam et al. ............ 361/686 |
| 2002/0144044 A1 * | 10/2002 | Moon et al. ............ 710/302 |
| 2002/0181197 A1 * | 12/2002 | Huang ............ 361/685 |
| 2004/0008497 A1 * | 1/2004 | Barringer et al. ............ 361/759 |
| 2004/0057203 A1 * | 3/2004 | Rabinovitz ............ 361/685 |
| 2005/0257232 A1 * | 11/2005 | Hidaka ............ 720/654 |
| 2006/0012950 A1 * | 1/2006 | Shih ............ 361/679 |
| 2006/0061955 A1 * | 3/2006 | Imblum ............ 361/685 |
| 2007/0017883 A1 * | 1/2007 | Bridges et al. ............ 211/26 |
| 2007/0053169 A1 * | 3/2007 | Carlson et al. ............ 361/727 |
| 2007/0230111 A1 * | 10/2007 | Starr et al. ............ 361/685 |

(Continued)

*Primary Examiner* — Adrian S Wilson
(74) *Attorney, Agent, or Firm* — Pillsbury Winthrop Shaw Pittman LLP

(57) ABSTRACT

There is disclosed a storage enclosure, a carrier, a method of receiving and/or removing disk drive units to/from a storage enclosure, methods of manufacturing a storage enclosure, and a method of mounting a disk drive unit in a storage enclosure. In an aspect of the invention, a storage enclosure (10) comprises: a housing (11); and, at least one drawer (20) movable mounted to the housing such that the drawer is able to move between a received position and a withdrawn position relative to the housing. The or each drawer has a plurality of bays (22) for receiving respective disk drive units (100) with the disk drive units being orientated on their sides. Each bay having an upwardly facing opening which is accessible for insertion and/or removal of the disk drive unit therethrough when the drawer is in the withdrawn position.

30 Claims, 10 Drawing Sheets

(56) References Cited

U.S. PATENT DOCUMENTS

| | | | |
|---|---|---|---|
| 2007/0247804 A1* | 10/2007 | Li et al. | 361/687 |
| 2008/0144293 A1* | 6/2008 | Aksamit et al. | 361/727 |
| 2009/0002934 A1* | 1/2009 | Carlson et al. | 361/684 |
| 2009/0237877 A1* | 9/2009 | Honda et al. | 361/679.39 |
| 2009/0257185 A1* | 10/2009 | Signer et al. | 361/679.32 |
| 2010/0118440 A1* | 5/2010 | Qu et al. | 360/133 |
| 2011/0069441 A1* | 3/2011 | Killen et al. | 361/679.33 |

* cited by examiner

STORAGE ENCLOSURE, CARRIER AND METHODS

The present invention relates in aspects to storage enclosures, to a carrier, to a method of receiving and/or removing disk drive units to/from a storage enclosure, to methods of manufacturing a storage enclosure, and to a method of mounting a disk drive unit in a storage enclosure.

In preferred embodiments, the present invention relates to storage enclosures for a plurality of disk drives, "redundant array of inexpensive disks" (RAID) arrays, "just a bunch of disks" (JBOD) functionality or "switched bunch of disks" (SBOD) functionality or "expander-based bunch of disks" (EBOD) functionality based on "SAS expander" technology, "storage array network" (SAN) or "network attached storage" (NAS) storage, server enclosures and the like.

As is conventional, references to "sides", "above", "below", "downward" etc, in relation to the enclosure and/or its bays are given with reference to the orientation of a conventionally mounted enclosure, i.e. one mounted laterally in a 19 inch (approx. 482.6 mm) rack. References to "above" and "side" in relation to the enclosure should be interpreted consistently with this. Nonetheless, these terms should also be construed accordingly to cover a situation where the enclosure is arranged so as to be turned on its side to be vertically arranged, or indeed in any orientation.

The use of storage enclosures for containing disk drive units is well known in the art per se. Such enclosures are usually modular, having disk drive module bays at the front of the enclosure for receiving disk drive modules (i.e. disk drive assemblies mounted in carriers), and bays at the rear of the enclosure for receiving various other modules, such as power supply units (PSUs), cooling modules and various electronics modules. These electronics modules typically include one or more controllers for the disk drive assemblies, providing input/output connections to the enclosure and implementing the desired functionality of the disk drives, e.g. as "just a bunch of disks" (JBOD) or an RAID array, etc. The electronics modules may also provide enclosure management services or other functionality. The various modules connect into a midplane within the enclosure. The modules are removable from the enclosure for maintenance and/or replacement. Often modules at the rear of the enclosure are provided in duplicate or more so that a certain measure of redundancy can be provided in case of failure of a module. Many different layouts and configurations of data storage enclosures are possible and, indeed, available commercially.

One important consideration in the manufacture of storage enclosures is the layout and positioning of the disk drive units within the enclosure. It is desirable to make best use of the available space in the storage enclosure to fit in as many disk drive units as possible to increase the amount of storage the enclosure can provide. However, there are various considerations balanced against this desire to fit in as many disk drives as possible. For example, the structure should preferably allow the disk drive units to be easily removed from and inserted to the enclosure, possibly by "hot-swapping" the disk drives so that that the enclosure need not taken out of use while the disk drive unit is swapped. The structure must also be strong and robust enough to support the disk drive units. In particular, in a storage enclosure with a large number of disk drive units, the weight of the enclosure is considerable. The support structure should be strong enough to support the weight of disk drive units whilst minimising any sagging. It is also necessary to ensure that adequate cooling is provided to the disk drive units to prevent overheating. This is usually implemented by providing a cooling airflow through the enclosure which cools the disk drive units and/or other components of the enclosure. The support structure should also therefore allow adequate airflow between the disk drive units.

FIG. 1 shows an example of a 3.5 inch (88.9 mm) disk drive unit 100. The disk drive unit 100 has a top face 101, a bottom face 102, side faces 103, a front end 104 and a rear end 105. The rear end 105 holds a rearward facing connector or connectors 106 for making power and data connection to the disk drive unit 100, e.g. a SATA connector. The height 107 of the disk drive unit 100 is 26.1 mm. The width 108 of the disk drive unit 100 is 101.6 mm. These dimensions are specified in the industry standard specification (SFF-8301).

FIG. 2 shows a frontal view of an example of a prior art storage enclosure 1. This enclosure 1 has a "2U12" arrangement. The height of the enclosure is 2U (approx. 88.9 mm) (a "U" being 1.75 inches (approx. 44.4 mm)). As can be seen, the enclosure 1 has a lattice structure 2 which defines a four by three arrangement of bays 3 for receiving 12 disk drive units 100 (hidden in FIG. 2). Each bay 3 has a door at the front, which can be opened to allow a disk drive unit 100 to be inserted. The disk drive unit 100 is received in the bay 3 with a horizontal orientation (i.e. its top face 101 uppermost). The disk drive unit 100 is advanced rearwardly into the enclosure with its rear face 105 facing the rear of the enclosure so that its connector 106 can mate with a connector on the midplane of the storage enclosure. In the vertical direction, three drives of 26.1 mm height are fitted into the 88.9 mm height, giving an 88.9% utilisation of the space. The rest of the space is taken up by structure for the enclosure and/or disk drive carriers and air gaps for cooling. However, importantly, this arrangement leaves only narrow air gaps between the top and bottom faces 102,103 of the disk drives 100. As will be appreciated, the top and bottom faces 102,103 of the disk drives 100 have the largest surface area, and so providing adequate airflow to these faces is of primary importance in cooling the disk drive units 100. This gives a density of 6 drives per U.

FIG. 3 shows another example of a prior art storage enclosure 1. This enclosure 1 has a "3U14" arrangement. The height of the enclosure is 3U (approx. 133.3 mm). The enclosure 1 has a structure 2 which defines a row of 14 bays for receiving 14 disk drive units. Each bay 3 has a door at the front, which can be opened to allow a disk drive unit 100 (hidden in FIG. 3) to be inserted. In this example, the disk drive unit 100 is received in the bay 3 with a vertical orientation (i.e. positioned on a side face 103). The disk drive unit 100 is advanced rearwardly into the enclosure with its rear face 105 facing the rear of the enclosure so that its connector 106 can mate with a connector on the midplane of the storage enclosure. In the vertical direction, the 101.6 mm width of the drives is fitted into the 133.3 mm height, giving 76% utilisation of the space. The rest of the space is taken up by structure for the enclosure and/or disk drive carriers and air gaps for cooling. This is a relatively inefficient use of the space in this dimension. This gives a density of 4.67 drives per U.

It is a general aim of the industry to increase the number of drives per U whilst maintaining structural integrity, providing convenient access to the disk drives for insertion and removal, providing high speed electronic communications with the disk drives and providing adequate air flow to the disk drives for cooling.

According to a first aspect of the present invention, there is provided a storage enclosure comprising a housing; and, at least one drawer movably mounted to the housing such that the drawer is able to move between a received position and a withdrawn position relative to the housing; the or each drawer having a plurality of bays for receiving respective disk drive units with the disk drive units being orientated on their sides, each bay having an upwardly facing opening which is accessible for insertion and/or removal of the disk drive unit therethrough when the drawer is in the withdrawn position.

The present inventions allows disk drive units to be inserted into bays in the enclosure from above. (It should be noted that "above" is with reference to the orientation of a conventionally mounted enclosure, i.e. with a horizontal mounting in a rack wherein preferably the drawer moves horizontally relative to the housing.) This allows full access to any of the disk drive units in the enclosure, whilst achieving a high packing density of disk drives in the enclosure without sacrificing the ability to supply an adequate cooling airflow for cooling the disk drives. For example, this means that with the drawer fully withdrawn, multiple rows of bays can be made accessible in the drawer making maximum use of the depth of the storage enclosure. This also allows in preferred embodiments any disk drive unit to be accessed and removed and/or inserted from the drawer without affecting any other disk drive in the storage enclosure or the operation of the storage enclosure.

The drawer structure and arrangement of bays is particularly advantageous with 3.5 inch disk drive units. When positioned on their side, two drawers of 3.5 inch disk drive units can be accommodated within a 5U space. The preferred drawer structure means that there need not be any transfer of force between adjacent drawers in the enclosure, preventing sagging in the centre of the drawers by transferring the weight of the disk drive units to the side of the housing.

It should be noted that the disk drive units may be in carriers when they are inserted into the bays and references in the claims to disk drive units should be interpreted to include disk drive units in carriers.

In a preferred embodiment, at least one drawer has at least one row of 14 bays, side by side, across its width. This allows a high density of drives in a standard 19 inch rack.

In a preferred embodiment, the storage enclosure has a plurality drawers, one on top of the other, each drawer being able to independently move between the received position and the withdrawn position, wherein two adjacent drawers lie within a 5U enclosure height. This allows a high density of drives within a 5U enclosure height and provides a superior density of drives to various prior art arrangements.

In a preferred embodiment, wherein at least one drawer has plural rows of bays, one in front of the other. Preferably, there are three rows of bays, which makes efficient use of the space in a 1 m deep rack, allowing sufficient space for the power supply, cooling and electronics modules with standards sizes as specified by the Storage Bridge Bay specification.

In a preferred embodiment, substantively all of the weight of the or each drawer is transmitted to the sides of the housing. This prevents sagging of the drawers in the middle and prevents the weight of the drawers being transmitted to the drawers underneath or to the bottom of the housing. Thus, cumulative weighting through the centre of the enclosure is largely avoided. Instead the forces are taken by the load bearing structures at the sides of the enclosure, i.e. ultimately by the rack in which the enclosure or enclosures are fixed. The prevention of sagging is important, as otherwise space within the enclosure must be allowed for sagging, or for reinforcing structure to brace the structure and reduce sagging, which might otherwise be more usefully employed for fitting in more disk drive units or greater airflow.

In a preferred embodiment, the drawer is open at its bottom face. This allows the drawer structure to have less depth, thereby allowing more disk drive units to be fitted into the available height.

In a preferred embodiment, the drawer comprises first and second side members at the sides of the drawer movably mounted to respective sides of the housing; and, at least one cross member attached between the side members, the cross member being arranged to support the disk drive units when received by the bays such that the weight of the disk drive units is transmitted via the cross member and the side members to the sides of the housing. The cross members and/or side members are preferably thin sheet material with a vertical orientation. This allows the material to bear the weight of the disk drives without significant sagging. The thin structural elements also do not take up much space in the enclosure, allowing more space to be used for accommodating disk drive units and cooling airflow channels. The cross members preferably have apertures to allow air movement.

In a preferred embodiment, the enclosure comprises a runner at each side of the drawer for attaching the drawer to the housing so that the drawer can move between its received position and its advanced position by a sliding motion; and, circuitry disposed in one or more of the spaces between the side of the drawer and the housing and above and/or below said runners. This utilises available space for electronics without taking up space that could be otherwise utilised by disk drive units and airflow channels. In contrast, prior art schemes typically put this circuitry within the support structure forming the bays for the disk drives, which takes up space in disk drive receiving portion of the enclosure.

In a preferred embodiment, the enclosure comprises a runner at each side of the drawer for attaching the drawer to the housing so that the drawer can move between its received position and its advanced position by a sliding motion; fanout circuitry disposed in one or more of the spaces between the side of the drawer and the housing and above and/or below said runners; and, a connector in each of said bays for connecting to a disk drive unit when received in the bay, the connectors being supported by the cross member and in electrical connection with the fanout circuitry. Preferably, the bays have upward facing connectors for receiving and connecting to the disk drive units as they are advanced into the bays from above.

In a preferred embodiment, the enclosure comprises a cable for carrying power to and/or data signals to and from the disk drive units, the cable having a first end fixed relative to and movable with the drawer and a second end fixed relative to the housing, wherein the cable has an unconstrained portion of sufficient length to allow the drawer to be moved to the withdrawn position, and wherein the housing contains a space in which the unconstrained portion of cable can at least partially coil when the drawer is moved to the received position. This allows a convenient way of connecting the disk drive units in the drawers to the rest of the enclosure, e.g. to the midplane of the enclosure and to the modules in the rear of the enclosure. The unconstrained length of cable allows the drawer to be moved to the withdrawn position without breaking connection to the disk drive units in the drawer. This for example allows the disk drive units to be "hot pluggable". The space in the housing allows the cable to partially coil when the drawer is received in to the housing so as to move out of the way and prevent possible snagging and damage to the cable through exceeding its permitted bend radii.

According to a second aspect of the present invention, there is provided a storage enclosure comprising a housing; and, a drawer having a plurality of bays for receiving disk drive units; a runner at each side of the drawer for attaching the drawer to the housing so that the drawer can be moved relative to the housing; and, circuitry disposed in one or more of the spaces between the side of the drawer and the housing and above and/or below said runners.

This utilises available space for electronics without taking up space that could be otherwise utilised by disk drive units and airflow channels. In contrast, prior art schemes typically put this circuitry within the support structure forming the bays for the disk drives, which takes up space in disk drive receiving portion of the enclosure.

According to a third aspect of the present invention, there is provided a storage enclosure comprising a housing having side walls; and, a drawer movably mounted within the housing, the drawer having a plurality of bays for receiving disk drive units, wherein substantially all of the weight of the drawer is transferred to the side walls of the housing.

This prevents sagging of the drawers in the middle and prevents the weight of the drawers being transmitted to the drawers underneath or to the bottom of the housing. Thus, cumulative weighting through the centre of the enclosure is largely avoided. Instead the forces are taken by the load bearing structures at the sides of the enclosure, i.e. ultimately by the rack in which the enclosure or enclosures are fixed. The prevention of sagging is important, as otherwise space must be allowed for sagging, or for reinforcing structure to brace the structure and mitigate sagging, which might otherwise be more usefully employed for fitting in more disk drive units or greater airflow.

In a preferred embodiment, the drawer comprises first and second side members at the sides of the drawer movably mounted to respective sides of the housing; and, at least one cross member attached between the side members, the cross member being arranged to support the disk drive units when received by the drawer such that the weight of the disk drive units is transmitted via the cross member and the side members to the sides of the housing.

In a preferred embodiment, the drawer is open at its bottom face.

According to a fourth aspect of the present invention, there is provided a carrier for receiving a disk drive unit, the carrier comprising a body portion for receiving a disk drive unit; an adaptor having a first connector for attaching to a connector of the disk drive unit and a second connector in electrical communication with the first connector, wherein the second connector is pluggable in a downward direction when the carrier is orientated such that a disk drive unit received by the carrier is on its side.

The carrier enables a disk drive unit with a standard rear facing connector to be pluggable in a downward direction when the disk drive is orientated on its side. This allows disk drive units to be inserted into the bays of a storage enclosure from above and orientated on their sides. As discussed above, this arrangement allows better packing density of drives in a storage enclosure.

The adaptor may be a direct electrical connection between the connectors, i.e. simply pass through some or all of the pins as desired. Alternatively, the adaptor may include further electronics to implement further functionality, for example a SAS to SATA bridge, power conversion and/or power control between the enclosure and the disk drive, a buffer device to improve signal integrity, and/or indicators such as a power good indicator or a fault detected indicator.

In a preferred embodiment, the adaptor comprises a circuit board with the first connector mounted thereto, with the second connector being provided by an edge connector of the board.

This provides a preferred way of implementing the adaptor, which allows the adaptor to be relatively thin. This minimises the room taken up in the enclosure by the adaptor, and to minimises possible disruption to airflow in the enclosure. This also helps keep the component count of the adaptor low.

In a preferred embodiment the carrier is arranged such that, when two carriers with disk drive units received therein are placed side by side, a channel is formed by the bodies of the two carriers between the disk drive units through which cooling air can be passed to cool the disk drive units during operation.

This provides a channel for cooling air to be drawn in channels above the top and bottom faces of the disk drives to cool the disk drives in use. This allows large airflow channels, which are better able to dissipate the heat generated by the disk drive units in use, which in turn increases the possible packing density of disk drive units possible in the enclosure.

According to a fifth aspect of the invention, there is provided a storage enclosure as described above containing at least one carrier as described above, wherein the bays of the storage enclosure have guide portions for receiving and guiding cooperating portions of the carrier when the carrier is advanced into the bay from above.

This helps ensure a positive seating of the disk drive units in the bays of the enclosure, and can help reduce vibration and noise, etc.

According to a sixth aspect of the present invention, there is provided a method of receiving and/or removing disk drive units to/from a storage enclosure, the storage enclosure having at least one drawer movably mounted in a housing, the method comprising: moving a drawer relative to the housing from a received position to a withdrawn position; inserting and/or removing a disk drive unit from a bay in the or each drawer with the disk drive units being orientated on their sides through an upwardly facing opening of the bay; and, moving the drawer to the received position.

According to a seventh aspect of the present invention, there is provided a method of manufacturing a storage enclosure, comprising: attaching a drawer to a housing with a runner at each side of the drawer so that the drawer can be moved relative to the housing; and, disposing circuitry in one or more of the spaces between the side of the drawer and the housing and above and/or below said runners.

According to an eighth aspect of the present invention, there is provided a method of manufacturing a storage enclosure, comprising: movably mounting a drawer in a housing having side walls; and, wherein substantially all of the weight of the drawer is transferred to the side walls of the housing.

According to an ninth aspect of the present invention, there is provided a method of mounting a disk drive unit in a storage enclosure, the method comprising: disposing a disk drive unit in a carrier, the carrier having a body portion for receiving a disk drive unit and an adaptor having a first connector for attaching to a connector of the disk drive unit and a second connector in electrical communication with the first connector, wherein the second connector is pluggable in a downward direction when the carrier is orientated such that a disk drive unit received by the carrier is on its side; orientating the disk drive unit on its side; and, plugging the carrier into a bay in the storage enclosure having an upward facing connector.

In a preferred embodiment, at least one bay and/or carrier has a latch mechanism arranged to secure a disk drive unit in its received position when the disk drive unit is inserted into the bay and/or upon release of the latch to move the disk drive unit to an protruding position for removal. This provides a convenient way of securing and extracting a disk drive from its bay.

Embodiments of the present invention will now be described by way of example with reference to the accompanying drawings, in which.

Figure 4:
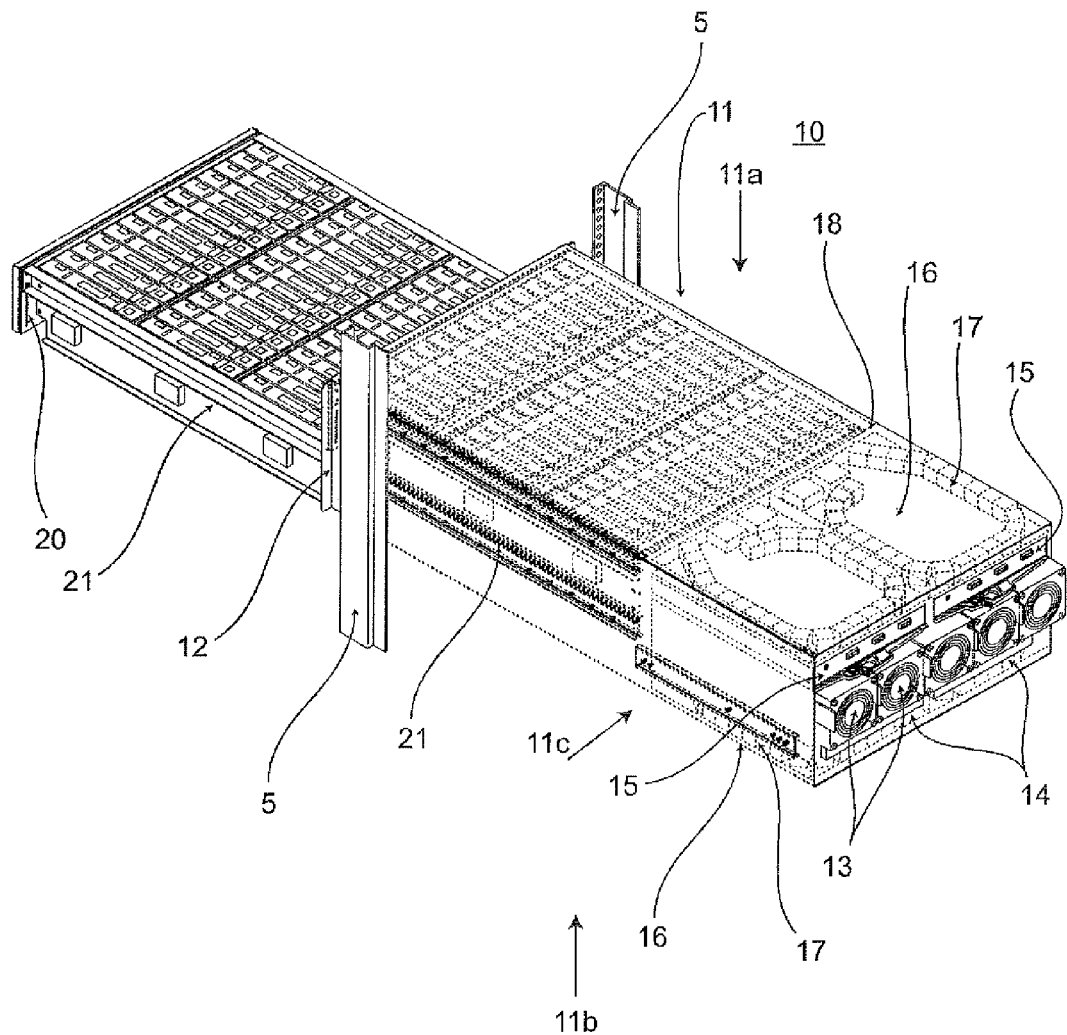
FIG. 4 shows a perspective view from the rear, side and top of an example of a storage enclosure according to an embodiment of the present invention.
Figure 5:
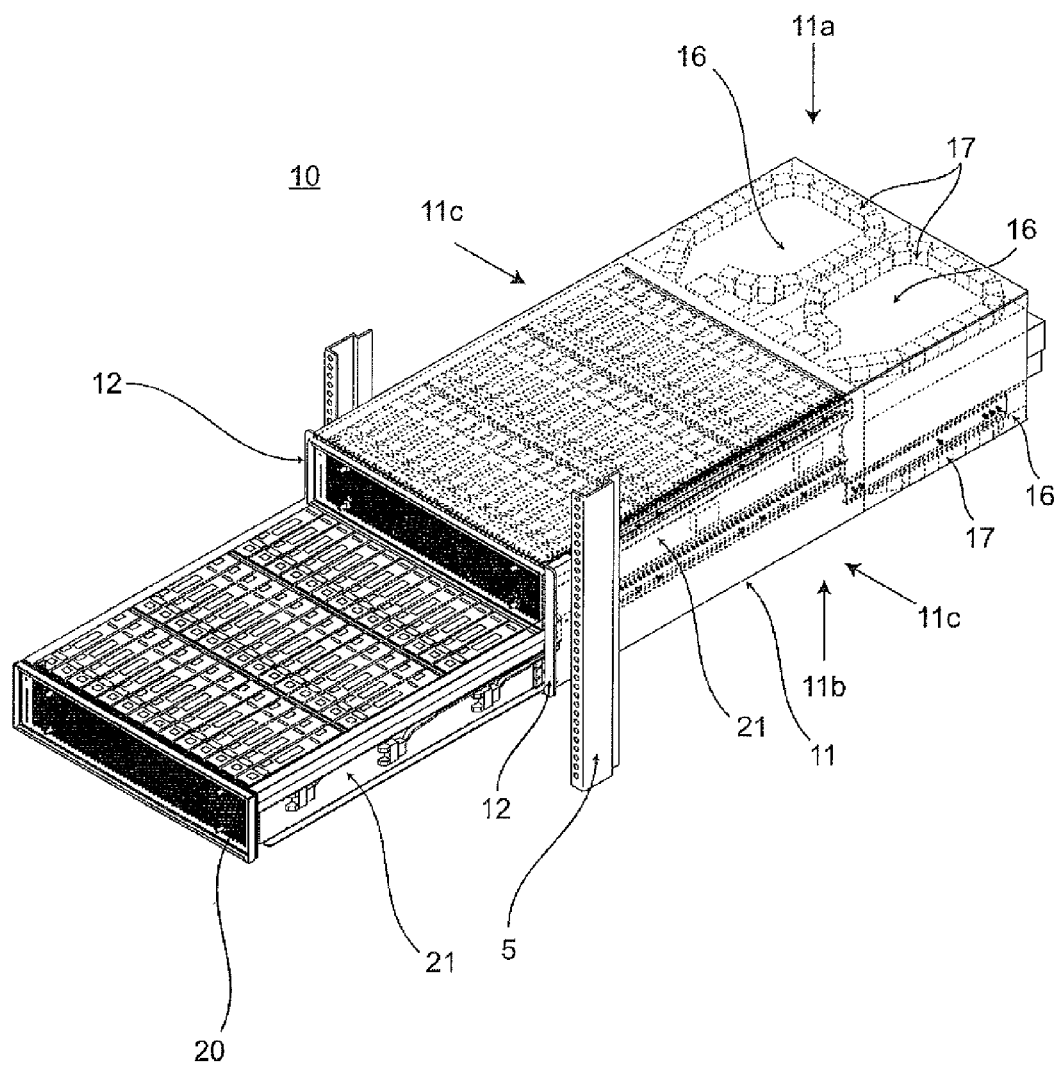
FIG. 5 shows a perspective view from the front, side and top of the storage enclosure of FIG. 4.

FIGS. 4 and 5 show an example of a storage enclosure 10 according to a preferred embodiment of the present invention. The storage enclosure 10 comprises a housing 11 having a top face 11A, bottom face 11B, and side faces 11C. The housing also has flanges 12 for fastening the storage enclosure 10 to a rack 5. For clarity, in FIG. 4, only the front posts of the rack 5 are shown. In practice, the rack 5 would preferably also have rear posts for attaching to and supporting the rear of the enclosure. The rack 5 may be provided in a cabinet having doors at the front and rear to allow the front and rear of the storage enclosure 10 to be accessed. In this example, the rack 5 is a standard nineteen inch wide rack (approx. 482.6 mm). The rack 5 may preferably have a depth of 1 meter.

The housing 11 is shown in transparency in FIGS. 4 and 5 to enable the components of the storage enclosure 10 to be more clearly seen. The storage enclosure 10 has a 5U height (approx. 222.2 mm). The front part of the storage enclosure 10 has two drawers 20 at the front. At the rear of the enclosure 10, a plurality of cooling modules 13 are arranged to draw cooling air through the enclosure 10 from front to rear. The enclosure 10 also has a plurality of power supply modules 14, for providing power to the enclosure. The enclosure 10 also has two electronics modules 15, by which external connection may be made to the storage enclosure 10, and which provides the desired organisation of the disk drives 100 to the storage enclosure 10. For example, the electronics modules 15 may arrange the disk drive units 100 as a raid array, or a JBOD (Just a Bunch Of Disks), or SBOD (Switched Bunch Of Disks), etc. The storage enclosure 10 also contains cavities 16 at the rear end at the top and the bottom of the housing 11 in which partially coiled cables 17 are disposed. The cables 17 make power and data connections between the disk drive units 100 in the front of the enclosure 10 and the various modules in the rear of the enclosure 10. The cable 17 has an unconstrained length sufficient to allow the drawers to be pulled forward from a received position in the enclosure 10 (as shown by the top most drawer 20) and a withdrawal position (as shown by the lower most drawer 20).

The drawers 20 are movably mounted to the housing 11 by runners 21 positioned either side of the drawers 20 which allow the drawer 20 to be moved between the withdrawn and received positions.

Figure 6:
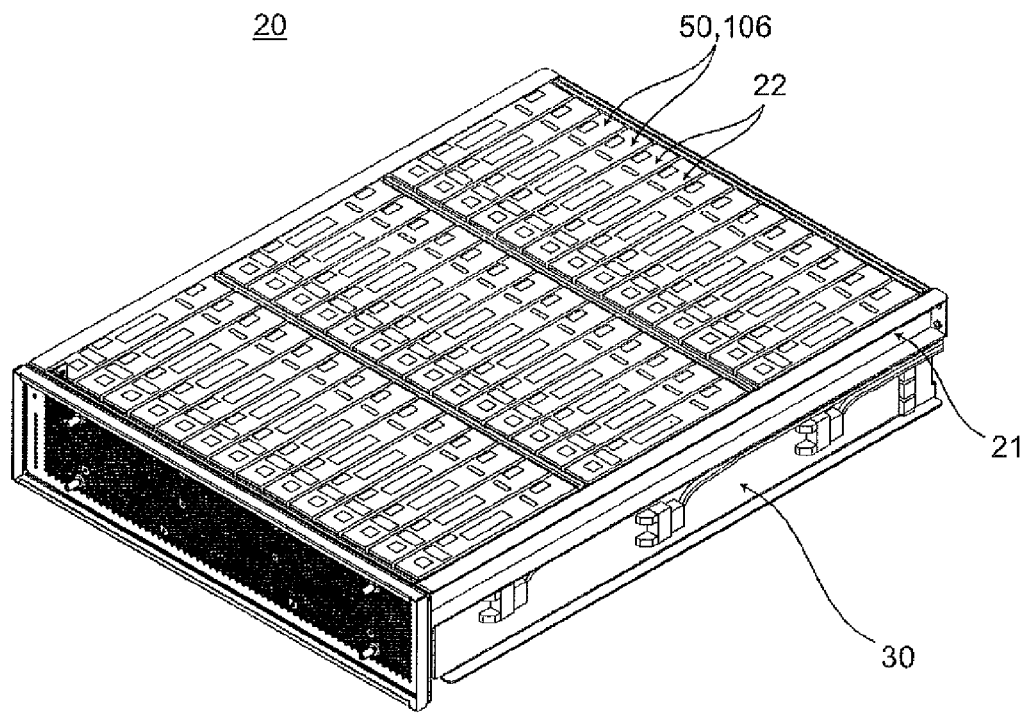
FIG. 6 shows a detailed view the drawer of FIG. 4.

FIG. 6 shows a more detailed view of a drawer 20 in isolation. In FIG. 6, the drawer 20 contains a plurality of bays 22 which are populated by disk drives 100 in carriers 50. Each drawer 20 has a single layer of bays 22 arranged in three rows of fourteen.

Figure 7:
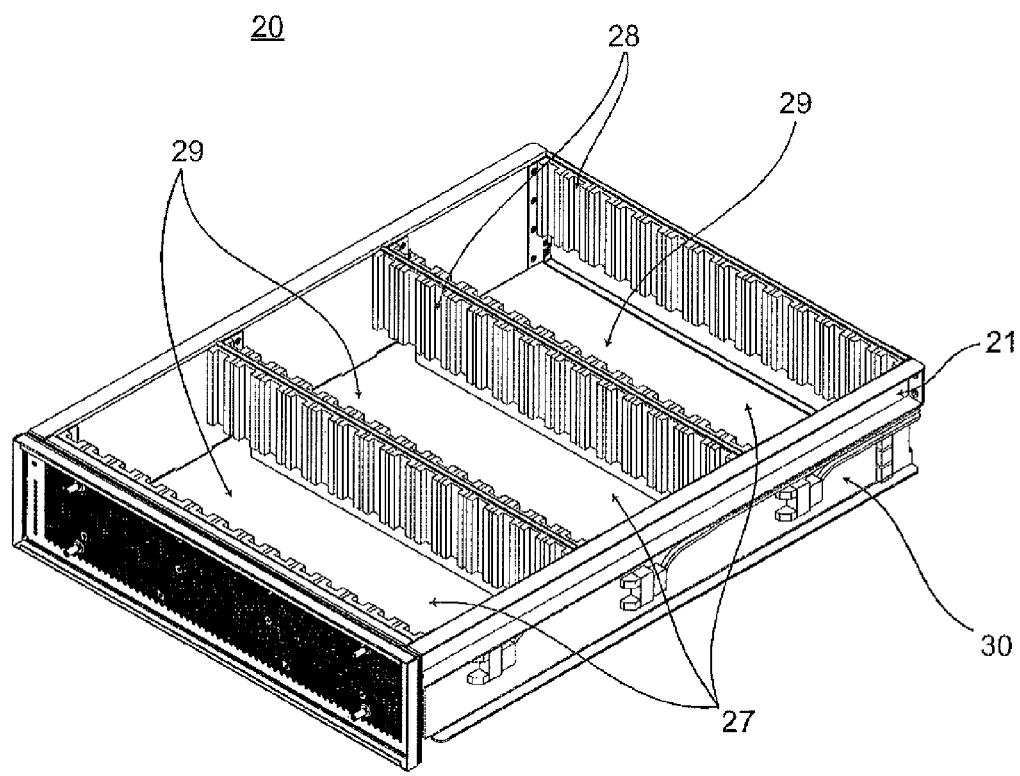
FIG. 7 shows the drawer with carriers and disk drive units removed.
Figure 8:
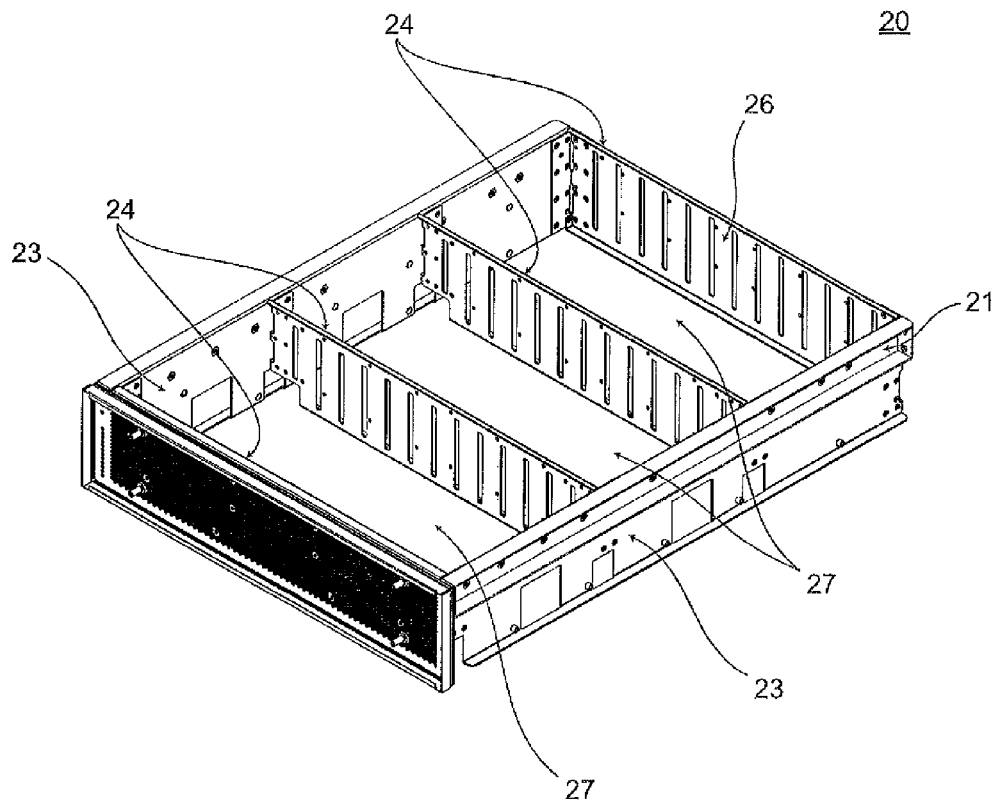
FIG. 8 shows in isolation the structural framework of the drawer.

FIG. 7 shows the drawer 20 unpopulated by disk drives 100. FIG. 8 shows the structural framework of the drawer 20. The framework consists of side members 23, and cross members 24 running between the side members 23. The cross members 24 have apertures 26, which allow cooling air to be drawn through the enclosure 10 to cool the disk drive units. The side members 23 and cross members 24 are formed from relatively thin elements, for example from sheet metal, and are disposed vertically so as to have a relatively small footprint when viewed vertically, whilst providing strength and stiffness in the vertical direction against downward acting loads.

The side members 23 and cross members 24 define three general spaces 27 within the drawer 20. As can be seen from FIG. 7, a series of guide members 28 are attached to the cross members 24 to help guide the disk drive carriers 50 into the bays 22 (see also FIG. 10). The guide members 28 may be manufactured for example from moulded plastics and attached to the cross members 24.

Figure 9:
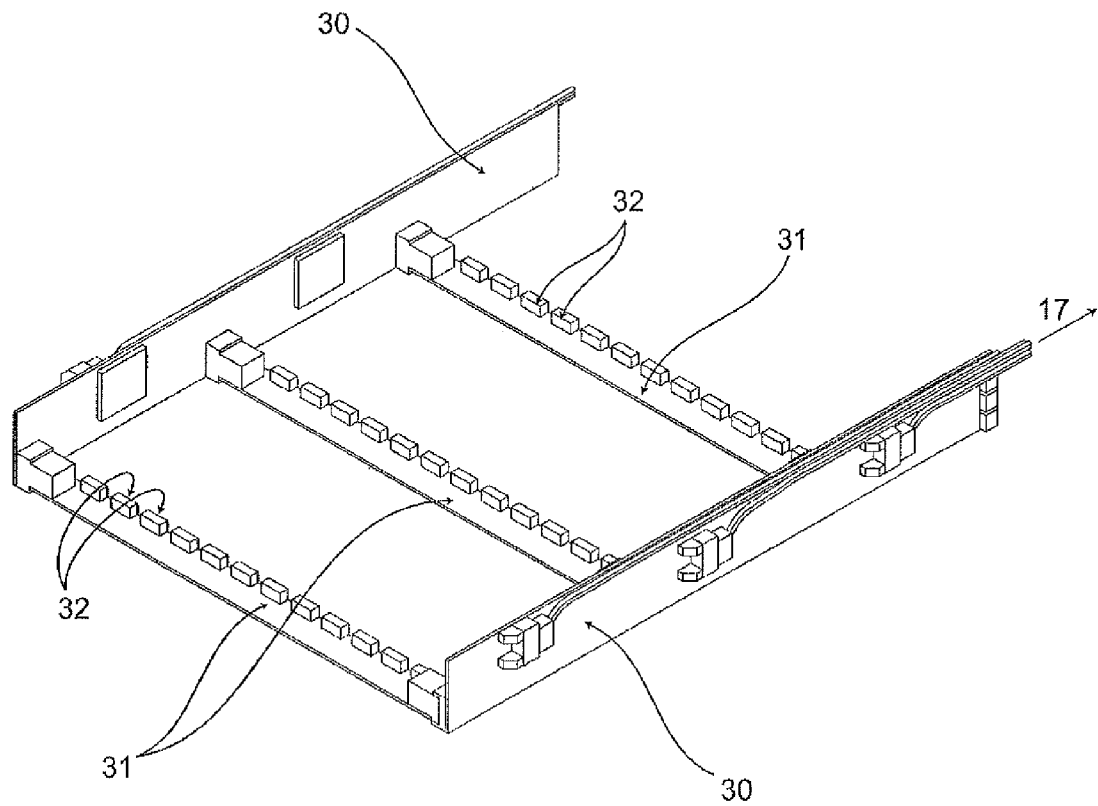
FIG. 9 shows in isolation the circuitry of the drawer.

Referring now to FIG. 9, the circuitry in the drawer 20 is shown with the rest of the structure of the drawer 20 omitted for clarity. A fanout board 30 runs along each side of the drawer 20 underneath the runner 21, attached to side members 23. A connector board 31 runs between the sides of the drawer 20 at the front of each bay 22 approximately underneath the cross members 24. The connector board 31 has mounted thereon a plurality of connectors 33. In this way, each bay 22 has an upward facing connector 32 at the front of the bay 22. The connectors 32 on each connector board 31 are connected to the circuitry on the fanout board 30. The fanout circuitry generally distributes the power and data signals between the various connectors 32 for the various bays 22 and connects them in turn to the cables 17, completing the connection from the disk drives 100 to the mid plane 18. By positioning the fanout board 30 underneath the runners 21, in the spaces between the sides of the drawers 20 and the sides of the housing 11, the free space between the drawers and the housing is utilised. This allows more space for the disk drives 100 and for air flow in the enclosure.

Figure 10:
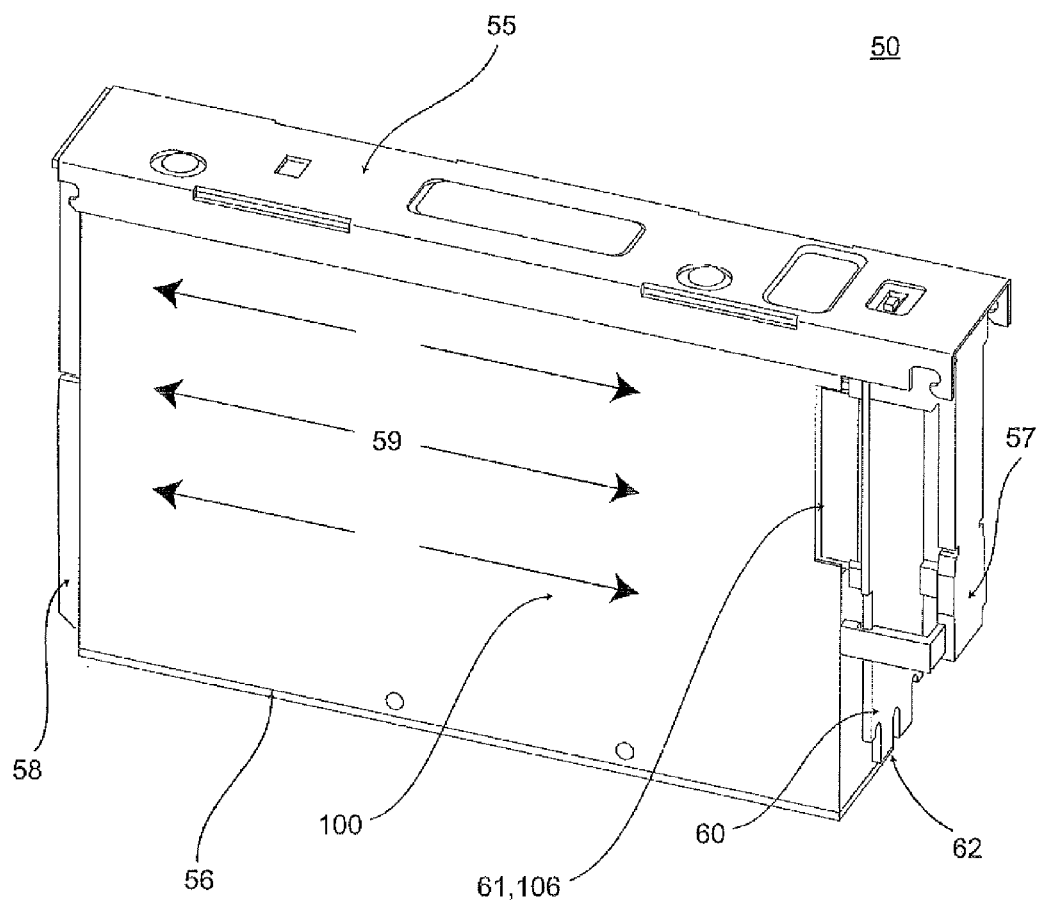
FIG. 10 shows a carrier and disk drive unit.

FIG. 10 shows a carrier 50 attached to a disk drive 100. The carrier 50 comprises a top piece 55 and a bottom piece 56 which run along the sides of the disk drive 100 and slightly wrap around onto its top and bottom faces 101, 102. The carrier 50 also has a front end piece 57 and a rear end piece 58 at the front and the rear faces 104, 105 of the disk drive 100 respectively. The front end piece 57 and the rear end piece 58 connect between the top piece 55 and bottom piece 56 to form a cage like structure around the disk drive unit 100. The front and end pieces 57, 58 are shaped to reciprocate with the guide members 28 in the bays 22 in order to guide the carrier 50 into and out of a received position within the bays 22 when the carrier 50 is advanced into the bays 22 from above.

The bays 22 and/or the carrier 50 may have a latch mechanism (not described in detail herein) arranged to secure a disk drive 100 in its received position when inserted into the bay 22 and/or upon release of the latch to move the disk drive 100 to an protruding position for removal. This provides a convenient way of extracting a disk drive 100 from its bay 22.

The carrier 50 also comprises an adaptor board 60. The adaptor board 60 is fixed to the front end piece 57 of the carrier 50 adjacent the rear end 105 of the disk drive unit 100. The adaptor board 60 has a first connector 61 mounted on the board arranged to plug into the disk drive connector 106. The adaptor board 60 has a second connector 62 at the bottom edge of the adaptor board 60 facing downwards with the disk drive 100 oriented as shown in FIG. 10, i.e. with the disk drive on its side 103. Preferably, the second connector 62 is an edge connector. The first connector 61 and the second connector 62 are electrically connected together. Thus, when the carrier 50 is inserted into a bay 22, the second connector 62 connects to the upward facing connector 32 in the bay 22. Thus, a connection is made from the disk drive 100, via the adaptor board 60, via the connector board 31, via the fanout board 30 and via cable 17 to the mid plane 18 of the enclosure 10.

The adaptor board 60 allows the disk drive 100 to be plugged into the connector 32 in its bay 22 with the disk drive 100 orientated on its side 103 and with a downward plugging motion. The adaptor board 60 may simply pass through signals between the bay connector 32 and the disk drive connector 106. The adaptor board 60 may optionally also include electronics to implement further functionality, for example a SAS to SATA bridge, power conversion and/or power control between the enclosure and the disk drive 100, a buffer device to improve signal integrity, and/or indicators such as a power good indicator or a fault detected indicator.

As previously described, the top piece 55 and bottom piece 56 of the carrier 50 extend around the sides of the disk drive 100. This in effect creates a channel 59 along the top and the bottom faces 101, 102 of the disk drive unit 100. Thus, when disk drive units 100 are inserted in their carriers 50 in the bays 22 of the drawer 20, a channel is formed between adjacent disk drives 100 running from the front of the enclosure 10 towards the rear of the enclosure 10. These channels are aligned with the apertures 26 in the cross members 24. The mid plane 18 and the front piece of the drawers 20 also have apertures (not shown). Thus, an air path is created from the front to the rear of the enclosure 10, allowing the cooling modules 13 to draw cooling air through the enclosure 10 to cool the various components therein.

As will be apparent from the foregoing description, the weight of the disk drives 100 and their carriers 50 is transferred to the cross members 24. The cross members 24 in turn are attached to the side members 23. Thus the weight of the disk drives 100 is transferred to the side members 23. The weight in turn is transferred via the runners 21 to the sides of the housing 11. These structural elements are generally tall, thin structural elements that do not take up much space in the enclosure 10, but which can support the weight of the disk drives 100 with minimal sagging. This way of supporting the disk drives 100 also allows the drawers 20 to have an open bottom face 29. The absence of a bottom face structure helps reduce the vertical height taken up by the drawers 20. This allows two drawers 20 to fit within a 5U enclosure height each drawer containing a layer of disk drives 100 orientated on its side. This also allows more space for air flow.

This is in contrast with prior art arrangements, where the lattice work of cells are used to define the bays for holding the disk drives. In this arrangement, the weight of the disk drives is transmitted via the cross bracing of the lattice work down the centre of the support framework, contributing to significant sagging in the middle of the support. Thus, in the preferred embodiment of the present invention, there is substantially no load on the bottom surface of the housing 11 of the storage enclosure 10. Rather, the weight of the disk drives 100 is distributed to the sides of the housing 11, which can bear the load without sagging.

Figure 1:
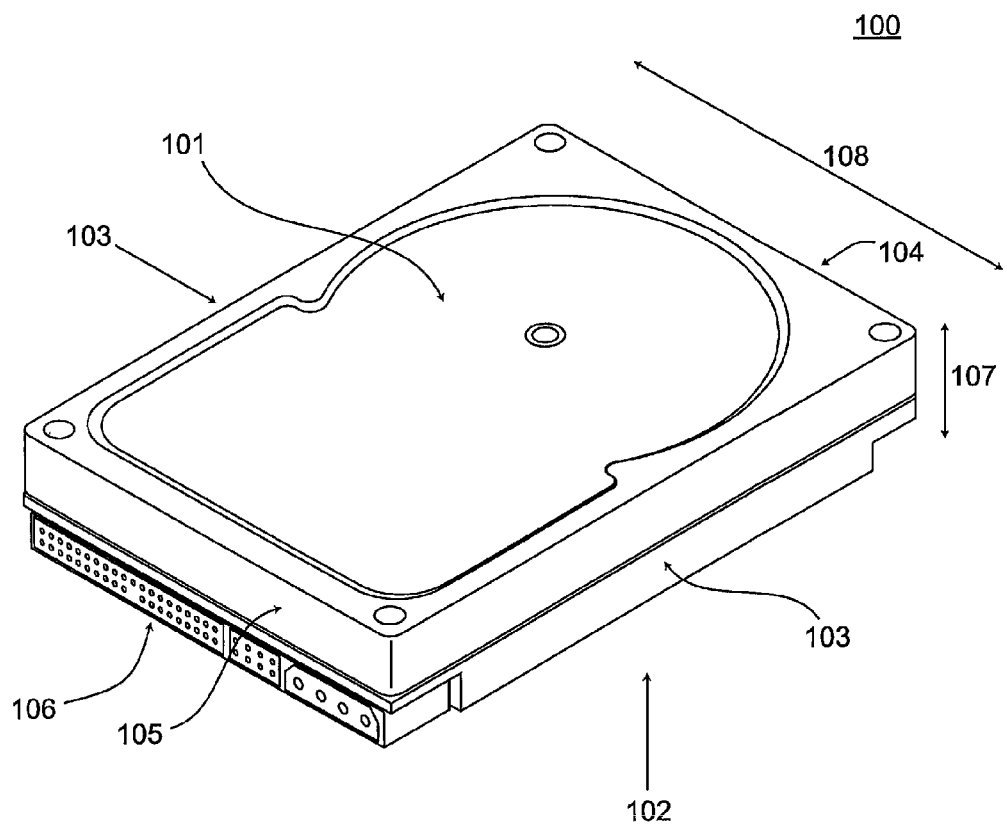
FIG. 1 shows a disk drive unit.
Figure 2:
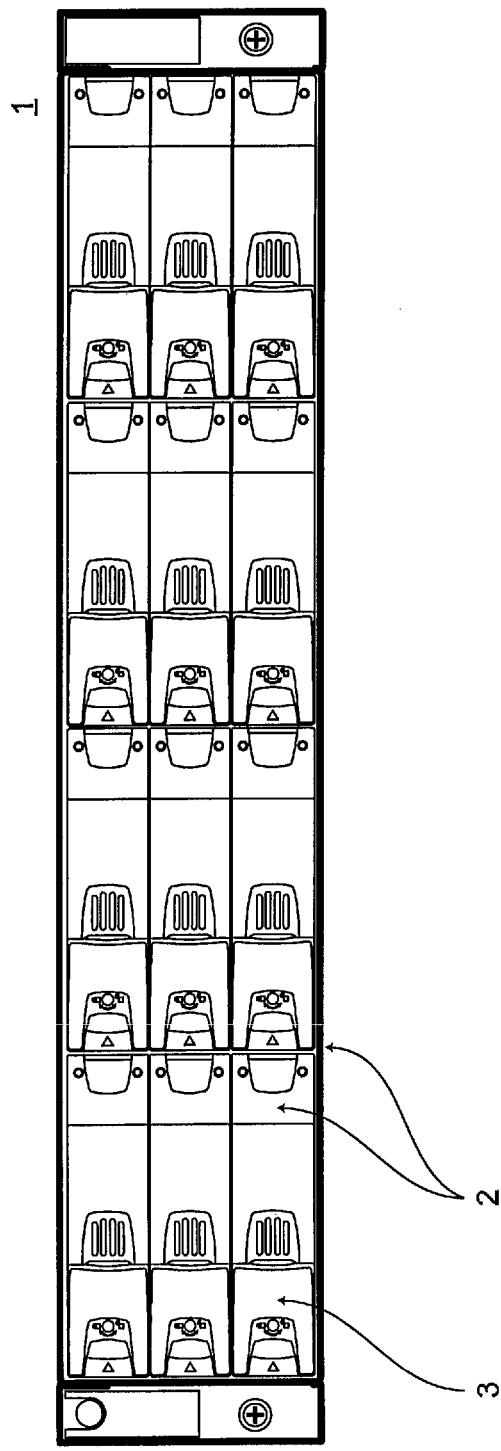
FIG. 2 shows a frontal view of a prior art storage enclosure.
Figure 3:
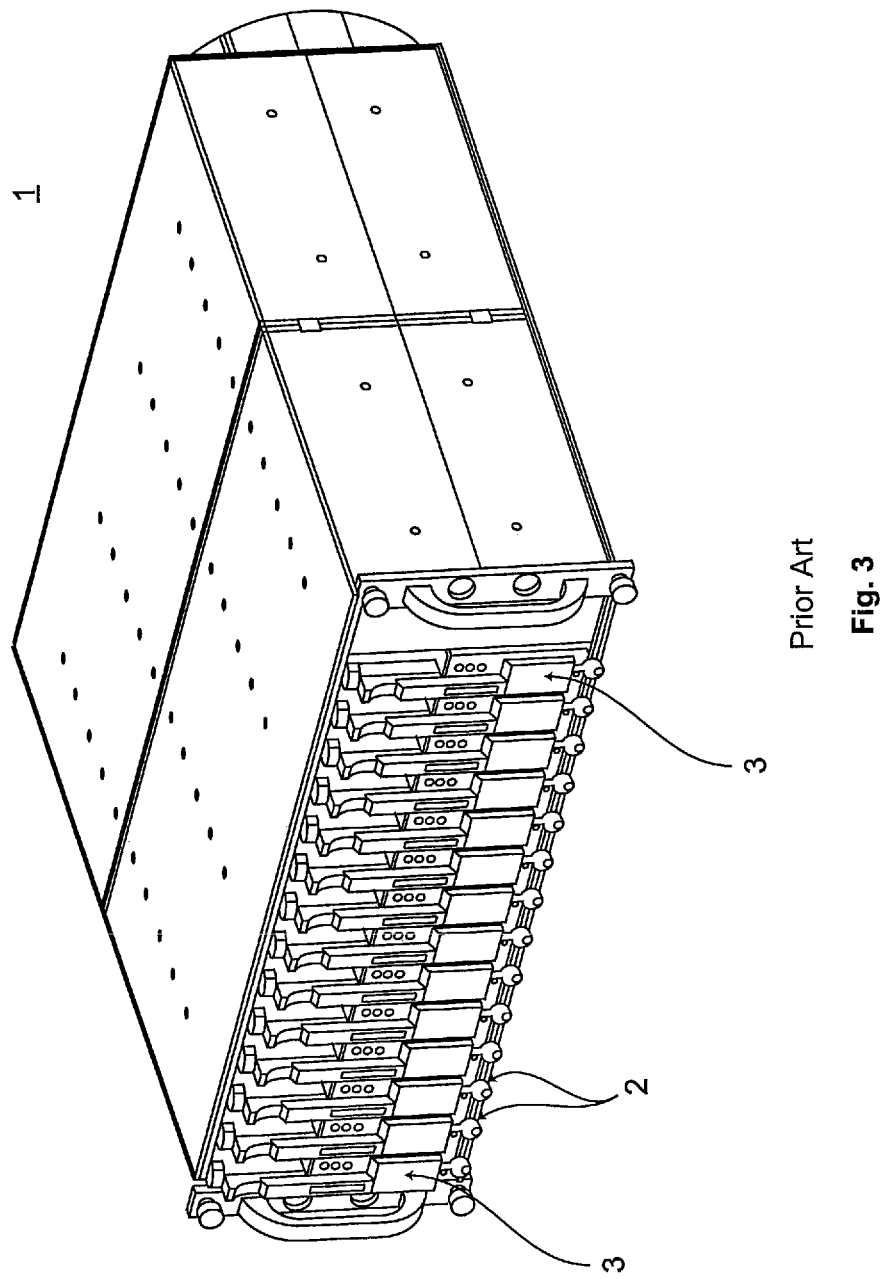
FIG. 3 shows a view from the front, side and top of another prior art storage enclosure.

Thus, the preferred embodiment allows an 5U84 configuration, i.e. eighty four 3.5 inch disk drive units and the necessary electronic modules, power modules and cooling modules to fit within a standard 5U high space within a one meter deep rack. This achieves a density of 16.8 drives per U. This is superior to the prior art enclosures of FIGS. 1 and 2 which achieve figures of 6 drives per U and 4.67 drives per U respectively. The preferred embodiment also achieves a utilisation of the vertical space of 91.4%. This is superior to the prior art of FIGS. 2 and 3 which achieve figures of 88% and 76% respectively. The preferred embodiment is also capable of supplying adequate airflow for cooling the disk drives whilst supporting the weight of the disk drives without significant sagging.

Embodiments of the present invention have been described with particular reference to the example illustrated. However, it will be appreciated that variations and modifications may be made to the examples described within the scope of the present invention.

For example, the present invention can be used with different forms of disk drives other than 3.5 inch disk drives, e.g. 2.5 inch disk drives can be used. The present invention may have different layout of bays within the drawers, e.g. four rows of bays per drawer instead of three rows as in the specific example.

The invention claimed is:

1. A storage enclosure comprising:
    a housing; and,
    at least one drawer movable mounted to the housing such that the drawer is able to move between a received position and a withdrawn position relative to the housing;
    the or each drawer having a plurality of bays for receiving respective disk drive units, the disk drive units having top and bottom faces, two side faces and two end faces, wherein one of the end faces has a disk drive connector, the disk drive units being received in the bays with the disk drive units being orientated on one of their side faces, each bay having an upwardly facing opening which is accessible for insertion and/or removal of the disk drive unit therethrough when the drawer is in the withdrawn position.

2. A storage enclosure according to claim 1, wherein at least one drawer has at least one row of 14 bays, side by side, across its width.

3. A storage enclosure according to claim 1, wherein the storage enclosure has a plurality drawers, one on top of the other, each drawer being able to independently move between the received position and the withdrawn position, wherein two adjacent drawers lie within a 5U enclosure height.

4. A storage enclosure according to claim 1, wherein at least one drawer has plural rows of bays, one in front of the other.

5. A storage enclosure according to claim 1, wherein substantively all of the weight of the or each drawer is transmitted to the sides of the housing.

6. A storage enclosure according to claim 5, wherein the drawer is open at its bottom face.

7. A storage enclosure according to claim 4, wherein the drawer comprises:
    first and second side members at the sides of the drawer movably mounted to respective sides of the housing; and,
    plural cross members attached between the side members, the cross members being arranged to support the disk drive units when received by the bays such that the weight of the disk drive units is transmitted via the cross members and the side members to the sides of the housing, wherein at least one cross member is positioned in between two rows of bays.

8. A storage enclosure according to claim 1, comprising:
    a runner at each side of the drawer for attaching the drawer to the housing so that the drawer can move between its received position and its advanced position by a sliding motion; and, circuitry disposed in one or more of the spaces between the side of the drawer and the housing and above and/or below said runners.

9. A storage enclosure according to claim 7, comprising:
a runner at each side of the drawer for attaching the drawer to the housing so that the drawer can move between its received position and its advanced position by a sliding motion;
fanout circuitry disposed in one or more of the spaces between the side of the drawer and the housing and above and/or below said runners; and,
a connector in each of said bays for connecting to a disk drive unit when received in the bay, the connectors being supported by the cross member and in electrical connection with the fanout circuitry.

10. A storage enclosure according to claim 1, comprising a cable for carrying power to and/or data signals to and from the disk drive units, the cable having a first end fixed relative to and movable with the drawer and a second end fixed relative to the housing, wherein the cable has an unconstrained portion of sufficient length to allow the drawer to be moved to the withdrawn position, and wherein the housing contains a space in which the unconstrained portion of cable can at least partially coil when the drawer is moved to the received position.

11. A storage enclosure comprising:
a housing; and,
a drawer having a plurality of rows of bays for receiving disk drive units;
a runner at each side of the drawer for attaching the drawer to the adjacent side of the housing so that the drawer can be moved relative to the housing; and,
fanout circuitry attached to the drawer disposed in one or more of the spaces between the side of the drawer and the adjacent side of the housing and above and/or below said runners, wherein the fanout circuitry distributes disk drive power and data signals along the sides of the drawer to each of the plural rows of disk drive units.

12. A storage enclosure comprising:
a housing having side walls; and,
a drawer movably mounted within the housing, the drawer having a plurality of rows of bays for receiving disk drive units,
wherein substantially all of the weight of the drawer is transferred to the side walls of the housing, wherein the drawer comprises:
first and second side members at the sides of the drawer movably mounted to respective sides of the housing; and
plural cross members attached between the side members, the cross members being arranged to support the disk drive units when received by the drawer such that substantially all of the weight of the disk drive units is transmitted to the cross members and via the cross members and the side members to the sides of the housing, wherein at least one cross member is positioned in between two rows of bays, wherein the cross members have connectors for connecting to said disk drive units when received in the bays or to said disk drive units received in carriers when received in the bays.

13. A storage enclosure according to claim 12, wherein the drawer is open at its bottom face.

14. A storage enclosure comprising:
a housing having side walls; and,
a drawer movably mounted within the housing, the drawer having a plurality of rows of bays for receiving disk drive units each bay having an upwardly facing opening which is accessible for insertion and/or removal of the disk drive unit therethrough when the drawer is withdrawn from the housing,
wherein substantially all of the weight of the drawer is transferred to the side walls of the housing, wherein the bays of the drawer have open bottom faces such that with a disk drive unit received in a bay, there is substantially no structure of the drawer beneath the disk drive unit.

15. A carrier for receiving a disk drive unit, the carrier comprising:
a body portion for receiving a disk drive unit, the disk drive unit having top and bottom faces, two side faces and two end faces, wherein one of the end faces has a disk drive connector;
an adaptor having a first connector for attaching to the disk drive connector and a second connector in electrical communication with the first connector, wherein the second connector faces in a perpendicular direction to the first connector such that it is pluggable in a downward direction when the carrier is orientated such that a disk drive unit received by the carrier is on its side face.

16. A carrier according to claim 15, wherein the adaptor comprises a circuit board with the first connector mounted thereto, with the second connector being provided by an edge connector of the board.

17. A carrier according to claim 15, wherein the carrier is arranged such that, when two carriers with disk drive units received therein are placed side by side, a channel is formed by the bodies of the two carriers between the disk drive units through which cooling air can be passed to cool the disk drive units during operation.

18. A storage enclosure according to claim 1 containing at least one carrier, the carrier comprising:
a body portion for receiving a disk drive unit, the disk drive unit having top and bottom faces, two side faces and two end faces, wherein one of the end faces has a disk drive connector;
an adaptor having a first connector for attaching to the disk drive connector and a second connector in electrical communication with the first connector, wherein the second connector faces in a perpendicular direction to the first connector such that it is pluggable in a downward direction when the carrier is orientated such that a disk drive unit received by the carrier is on its side face,
wherein the bays of the storage enclosure have guide portions for receiving and guiding cooperating portions of the carrier when the carrier is advanced into the bay from above.

19. A method of receiving and/or removing disk drive units to/from a storage enclosure, the disk drive units having top and bottom faces, two side faces and two end faces, wherein one of the end faces has a disk drive connector, the storage enclosure having at least one drawer movably mounted in a housing, the method comprising:
moving a drawer relative to the housing from a received position to a withdrawn position;
inserting and/or removing a disk drive unit from a bay in the or each drawer through an upwardly facing opening of the bay with the disk drive units being orientated on one of their side faces; and,
moving the drawer to the received position.

20. A method of manufacturing a storage enclosure having a plurality of rows of bays for receiving disk drive units, comprising:
attaching the sides of a drawer to the adjacent sides of a housing with a runner at each side of the drawer so that the drawer can be moved relative to the housing; and, attaching fanout circuitry to the sides of the drawer in one or more of the spaces between the side of the drawer and the adjacent side of the housing and above and/or below said runners, wherein the fanout circuitry distributes disk drive power and data signals along the sides of the drawer to each of the plural rows of disk drive units.

21. A method of manufacturing a storage enclosure, comprising:

movably mounting a drawer in a housing having side walls, the drawer having a plurality of rows of bays for receiving disk drive units; and, wherein substantially all of the weight of the drawer is transferred to the side walls of the housing, wherein the drawer comprises:

first and second side members at the sides of the drawer movably mounted to respective sides of the housing; and, plural cross members attached between the side members positioned in between two rows of bays, the cross members being arranged to support the disk drive units when received by the drawer such substantially all of that the weight of the disk drive units is transmitted to the cross members and via the cross members and the side members to the sides of the housing, wherein at least one cross member is positioned in between two rows of bays, wherein the cross members have connectors for connecting to said disk drive units when received in the bays or to said disk drive units received in carriers when received in the bays.

22. A method of mounting a disk drive unit in a storage enclosure, the method comprising:

disposing a disk drive unit in a carrier, the disk drive unit having top and bottom faces, two side faces and two end faces, wherein one of the end faces has a disk drive connector, the carrier having a body portion for receiving a disk drive unit and an adaptor having a first connector for attaching to a connector of the disk drive unit and a second connector in electrical communication with the first connector, wherein the second connector faces in a perpendicular direction to the first connector such that it is pluggable in a downward direction when the carrier is orientated such that a disk drive unit received by the carrier is on its side face;

orientating the disk drive unit on its side face; and, plugging the carrier into a bay in the storage enclosure having an upward facing connector.

23. A storage enclosure according to claim 7, wherein at least one cross member positioned between two rows of bays is thin relative to its vertical extent.

24. A storage enclosure according to claim 12, wherein at least one cross member positioned between two rows of bays is thin relative to its vertical extent.

25. A method of manufacturing a storage enclosure, comprising:

movably mounting a drawer in a housing having side walls, the drawer having a plurality of bays for receiving disk drive units, each bay having an upwardly facing opening which is accessible for insertion and/or removal of the disk drive unit therethrough when the drawer is withdrawn from the housing; and, wherein substantially all of the weight of the drawer is transferred to the side walls of the housing, wherein the bays of the drawer have open bottom faces such that with a disk drive unit received in a bay, there is substantially no structure of the enclosure beneath the disk drive unit.

26. A method according to claim 21, wherein at least one cross member positioned between two rows of bays is thin relative to its vertical extent.

27. A method according to claim 25, wherein at least one cross member positioned between two rows of bays is thin relative to its vertical extent.

28. A storage enclosure according to claim 12, wherein the connectors of the cross member are positioned higher than the bottom of the bays for receiving the disk drive units.

29. A storage enclosure according to claim 21, wherein the connectors of the cross member are positioned higher than the bottom of the bays for receiving the disk drive units.

30. A storage enclosure according to claim 1, wherein the disk drive units are 3.5 inch disk drive units.

* * * * *